United States Patent
Ha et al.

(10) Patent No.: US 9,026,785 B2
(45) Date of Patent: May 5, 2015

(54) METHOD AND APPARATUS FOR SMART-KEY MANAGEMENT

(75) Inventors: Dong-Sik Ha, Seoul (KR); Jin-Young Park, Seoul (KR)

(73) Assignee: KT Corporation, Seongnam (KR)

( * ) Notice: Subject to any disclaimer, the term of this patent is extended or adjusted under 35 U.S.C. 154(b) by 56 days.

(21) Appl. No.: 13/313,782

(22) Filed: Dec. 7, 2011

(65) Prior Publication Data

US 2012/0159152 A1    Jun. 21, 2012

(30) Foreign Application Priority Data

Dec. 21, 2010  (KR) ................ 10-2010-0131905

(51) Int. Cl.

| | | |
|---|---|---|
| H04L 29/06 | (2006.01) | |
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |
| G11C 7/00 | (2006.01) | |
| H04L 9/00 | (2006.01) | |
| G06F 21/62 | (2013.01) | |
| H04W 12/04 | (2009.01) | |
| H04L 9/32 | (2006.01) | |
| H04W 12/06 | (2009.01) | |

(52) U.S. Cl.

CPC ............ *H04L 63/0853* (2013.01); *G06F 21/62* (2013.01); *H04L 9/32* (2013.01); *H04L 63/06* (2013.01); *H04W 12/04* (2013.01); *H04W 12/06* (2013.01)

(58) Field of Classification Search

CPC ........... G06F 21/62; H04W 12/04; H04L 9/32
USPC .......................................................... 726/16
See application file for complete search history.

(56) References Cited

U.S. PATENT DOCUMENTS

| | | | | |
|---|---|---|---|---|
| 6,351,813 | B1 * | 2/2002 | Mooney et al. ............... | 713/185 |
| 7,363,056 | B2 * | 4/2008 | Faisy ............................ | 455/558 |
| 7,640,005 | B2 * | 12/2009 | Matsumoto et al. .......... | 455/411 |
| 7,868,736 | B2 * | 1/2011 | Fukushima et al. .......... | 340/5.8 |
| 7,882,346 | B2 * | 2/2011 | O'Neill et al. ................ | 713/153 |
| 2004/0263316 | A1 * | 12/2004 | Dix et al. ...................... | 340/5.23 |
| 2006/0085846 | A1 * | 4/2006 | Uno et al. ......................... | 726/6 |
| 2006/0143463 | A1 * | 6/2006 | Ikeda et al. ................... | 713/182 |
| 2006/0276175 | A1 * | 12/2006 | Chandran ..................... | 455/411 |
| 2008/0260156 | A1 * | 10/2008 | Baba et al. ................... | 380/277 |

(Continued)

FOREIGN PATENT DOCUMENTS

| | | | | |
|---|---|---|---|---|
| JP | 2006009333 | A | * | 1/2006 |
| JP | 2006262184 | A | * | 9/2006 |

(Continued)

*Primary Examiner* — Dede Zecher
*Assistant Examiner* — Jason C Chiang
(74) *Attorney, Agent, or Firm* — Sughrue Mion, PLLC

(57) ABSTRACT

A method and an apparatus for smart key management are disclosed. The apparatus for smart key management can receive a smart key duplicate request message from a user terminal, perform user authentication using terminal information or user information included in the smart key duplicate request message, duplicate a registered smart key corresponding to the terminal information or the user information if the result the user authentication is authentication success, and transmit the duplicated smart key to a target terminal using the target terminal information.

13 Claims, 7 Drawing Sheets

(56) References Cited

U.S. PATENT DOCUMENTS

2010/0007497 A1* 1/2010 Takeda et al. ............. 340/572.1
2011/0064224 A1* 3/2011 Rebuli .......................... 380/277

FOREIGN PATENT DOCUMENTS

JP          2010126949 A   *   6/2010
KR              806186 B1  *   2/2008

* cited by examiner

METHOD AND APPARATUS FOR SMART-KEY MANAGEMENT

CROSS-REFERENCE TO RELATED APPLICATIONS

This application claims the benefit of Korean Patent Application No. 10-2010-0131905, filed with the Korean Intellectual Property Office on Dec. 21, 2010, the disclosure of which is incorporated herein by reference in its entirety.

BACKGROUND

1. Technical Field

The present invention relates to a smart key, more specifically to a method and an apparatus for remotely managing a smart key by use of a user terminal.

2. Background Art

Aided by economic development, motor vehicles have become widely popular. Accordingly, a variety of technologies have been researched and developed for increasing the convenience of using the motor vehicles. One such area is the smart key system, which can remotely control the ignition and set an alarm of the motor vehicle in close proximity by use of wireless communication technologies instead of controlling the ignition of the motor vehicle by inserting and operating a mechanical control device.

In the conventional smart key system, the driver of the motor vehicle needed to carry a particular control device. Accordingly, there have been a number of studies recently for a technology that can control the motor vehicle without any separate control device.

SUMMARY

The present invention provides a method and an apparatus for smart key management that can duplicate a smart key stored in a smart card, which is attachable to and detachable from a user terminal, in a file format and provide the smart key to another terminal.

The present invention also provides a method and an apparatus for smart key management that can remotely delete the duplicated smart key after a certain length of time is lapsed.

The present invention also provides a method and an apparatus for smart key management that can notify a user of use of the smart key that has been lost.

An aspect of the present invention features an apparatus for duplicating a smart key corresponding to a user terminal and transmitting the duplicated smart key to a target terminal.

According to an embodiment of the present invention, the apparatus for smart key management can include: a communication part configured to receive a smart key duplicate request message from a user terminal, the smart key duplicate request message including target terminal information and at least one of terminal information and user information of the user terminal; an authentication part configured to perform user authentication and generate an authentication result by using the terminal information or the user information; and a key management part configured to duplicate a registered smart key corresponding to the terminal information or the user information if the authentication result is authentication success and configured to control the communication part to transmit the duplicated smart key to a target terminal using the target terminal information.

According to another embodiment of the present invention, a user terminal can be provided by including: a smart card installed in the user terminal and configured to store a smart key; an input part configured to be inputted with a smart key duplicate request command including target terminal information; a key management part configured to extract and duplicate the smart key from the smart card according to the smart key duplicate request command; and a communication part configured to transmit the duplicated smart key to a target terminal using the target terminal information.

Another aspect of the present invention features a method for duplicating a smart key corresponding to a user terminal and transmitting the duplicated smart key to a target terminal.

According to an embodiment of the present invention, the method for smart key management by a smart key management apparatus connected with one or more user terminals through a communication network can include: (a) receiving a smart key duplicate request message from the user terminal, the smart key duplicate request message including target terminal information and at least one of terminal information and user information of the user terminal; (b) performing user authentication and generating an authentication result by using the terminal information or the user information; and (c) duplicating a registered smart key corresponding to the terminal information or the user information if the authentication result is authentication success and transmitting the duplicated smart key to a target terminal using the target terminal information.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, a certain embodiment of the present invention will be described with reference to the accompanying drawings.

Figure 1:
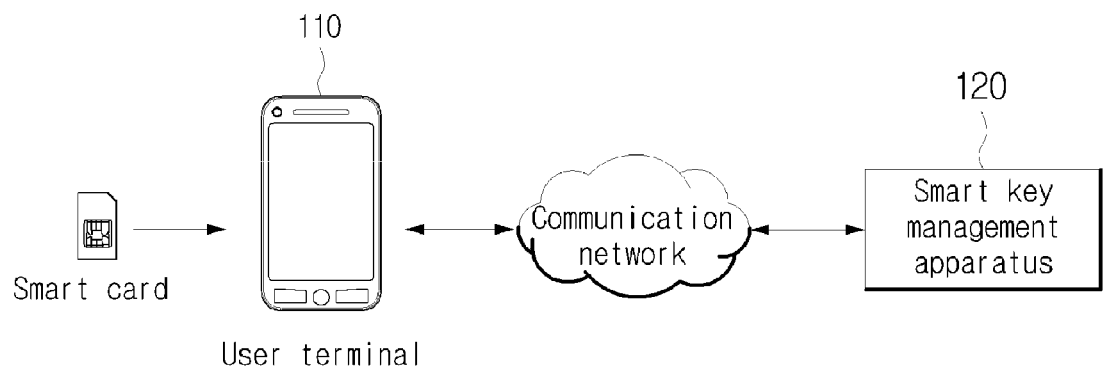
FIG. 1 is a block diagram briefly illustrating the configuration of a smart key management system that manages a smart key.
Figure 2:
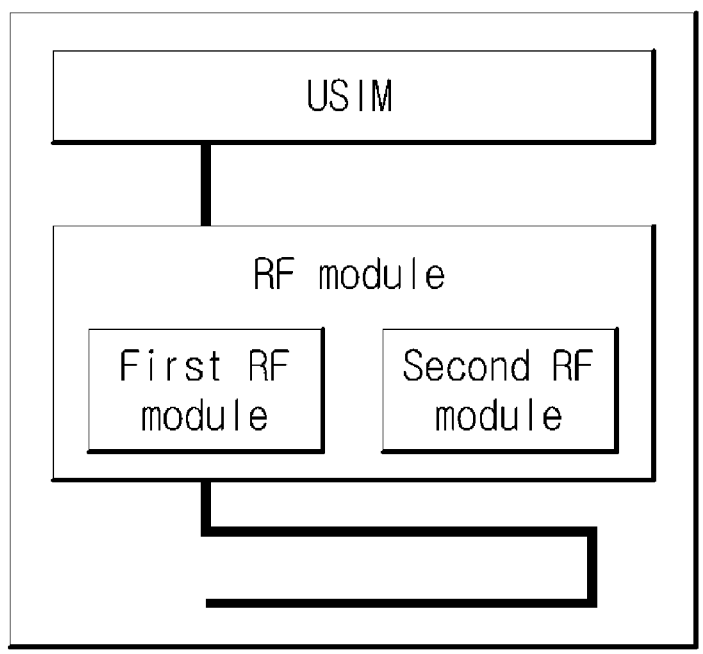
FIG. 2 is a block diagram briefly illustrating the structure of a smart key that is attached to and detached from a user terminal.

FIG. 1 is a block diagram briefly illustrating the configuration of a smart key management system that manages a smart key, and FIG. 2 is a block diagram briefly illustrating the structure of a smart key that is attached to and detached from a user terminal.

Referring to FIG. 1, the smart key management system includes a user terminal 110 and a smart key management apparatus 120.

The user terminal 110 is a terminal in which a smart card is installed, and a smart key for controlling a motor vehicle is stored in the smart key. It will be assumed in the description that the user terminal 110 is installed with an application for controlling the motor vehicle using the smart key stored in the smart card.

Any apparatus can be used as the user terminal 110 as long as it can be connected with the smart key directly or indirectly, can periodically communicate with the smart key management apparatus 120 using the smart key stored in the smart card, and can control the motor vehicle.

For example, the user terminal 110 can be a typical mobile communication terminal, a smart phone, etc.

Illustrated in FIG. 2 is the brief structure of the smart key that is attached to and detached from the user terminal 110. For easy description and understanding, the brief structure of the smart card by referring to FIG. 2.

As illustrated in FIG. 2, the smart card has a first RF module, which is for first data communication, and a second RF module, which is for second data communication. Here, the first RF module can be one of a 447 Mhz RF module and a 125 Khz RF module, and the second RF module can be the other of the 447 Mhz RF module and the 125 Khz RF module. Also, an antenna for data communication of the first RF module and the second RF module can be arranged on one surface of the smart card. The antenna can be arranged directly on the one surface of the smart card, or a film type of antenna can be attached to the one surface of the smart card. Also, it is possible that an antenna that is not arranged on or attached to the smart card in correspondence with the first RF module and the second RF module is attached to one surface of a battery of the user terminal 110 or is in direct contact with the smart card.

Referring to FIG. 1 again, by being connected with the smart key management apparatus 120 through a communication network, the user terminal 110 can duplicate and send the smart key to another terminal or remotely control the smart key to be deleted. This will be understood more clearly through the description below.

In another example, the user terminal 110 can duplicate and send the smart key stored in the smart card installed in the user terminal 110 to another terminal or control said smart key to be deleted, without being connected with the smart key management apparatus 120.

The smart key management apparatus 120 stores the smart key for each user in a database and checks and manages the validity of use of the smart key of the pertinent user terminal 110 by being connected with the user terminal 110 through the communication network. This will be described in more detail later by referring to the pertinent drawing.

Figure 3:
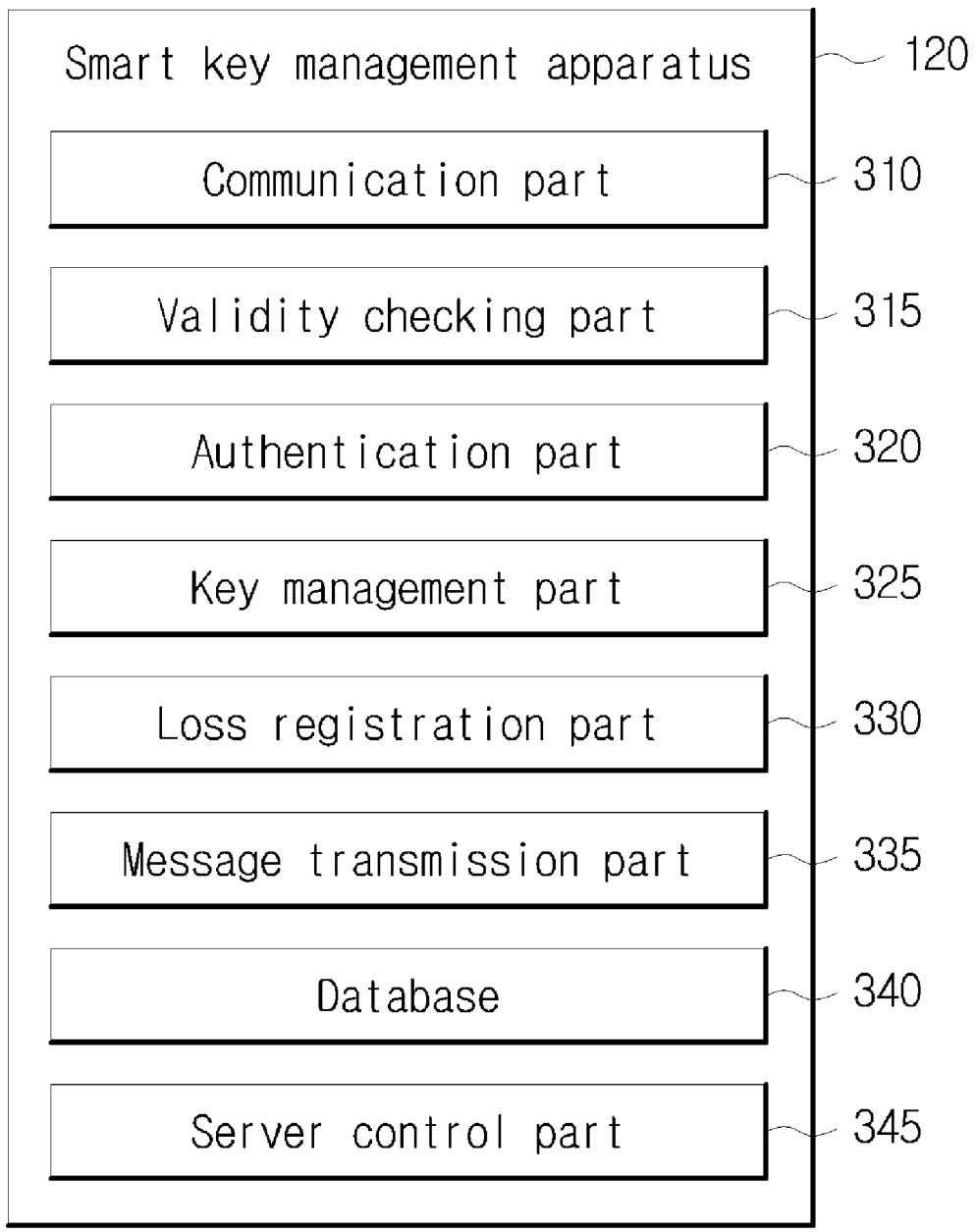
FIG. 3 is a block diagram briefly illustrating an internal configuration of a management server that manages a smart key of a user terminal.

FIG. 3 is a block diagram briefly illustrating an internal configuration of a management server that manages a smart key of a user terminal.

Referring to FIG. 3, the smart key management apparatus 120 is configured by including a communication part 310, a validity checking part 315, an authentication part 320, a key management part 325, a loss registration part 330, a message transmission part 335, a database 340 and a server control part 345.

The communication part 310 is connected with the user terminal 110 through the communication network and handles the function of communicating data. For example, the communication part 310 can receive a smart key duplicate request message from the user terminal 110 and output the message to the authentication part 320. Also, the communication part 310 can receive a validity check request message from the user terminal 110 and output the message to the validity checking part 315.

The validity checking part 315 receives the validity check request message from the user terminal 110 through the communication part 310 and handles the function of checking the validity of the smart key stored in the smart card of the user terminal 110.

For example, the user terminal 110 is installed with an application that is downloaded through the smart key management apparatus 120 for control of the motor vehicle. Accordingly, if an execution command of the application is inputted through the user terminal 110 by the user, the user terminal 110 generates the validity check request message that includes terminal information of the user terminal 110 when the application is executed and sends the validity check request message to the smart key management apparatus 120. Of course, it is also possible that the validity check request message is periodically sent to the smart key management apparatus 120 while the application is executed as well as when the application is executed.

Accordingly, the validity checking part 315 can extract the terminal information included in the validity check request message, check whether the use status of the smart key registered in correspondence with the terminal information is in a lost state, and determine whether or not the smart key stored in the smart card of the user terminal 110 may be used.

For instance, if the use status is a lost state, the validity checking part 315 can control the application installed (or executed) in the user terminal 110 to be stopped so that it becomes impossible to control the motor vehicle using the smart key stored in the smart card installed in the pertinent user terminal 110.

Of course, in addition to forcefully stopping the execution of the application in the user terminal 110, the validity checking part 315 can control the smart key stored in the smart card of the user terminal 110 to be deleted.

Although it is assumed in FIG. 3 that the validity check request message transmits the terminal information only, it is also possible that, depending on how it is embodied, the validity check request message additionally includes the smart key stored in the smart card of the user terminal 110 for the verification of the validity of the user terminal 110. It is also possible that, according to how it is embodied, the validity check request message includes the smart key only.

The authentication part 320 handles user authentication for the user terminal 110 and outputs authentication result to the key management part 325, if a smart key duplicate request message or a smart key delete request message is received from the user terminal 110 through the communication part 310. Here, the smart key duplicate request message or the smart key delete request message can include the terminal information or user information of the user terminal 110 and target terminal information.

Accordingly, the authentication part 320 can extract the terminal information or the user information from the smart key duplicate request message or the smart key delete request message, compare the extracted information with terminal information or user information that is pre-stored in the database 340, and can generate the authentication result by performing the user authentication according to the identicalness of the compared information.

In other words, depending on how it is embodied, the authentication part 320 can perform the user authentication using the terminal information only or the user information only. Of course, it shall be appreciated that, depending on how it is embodied, the user authentication can be performed using the terminal information and the user information.

The key management part 325 registers the smart key per user information or per terminal information in the database 340 or deletes the smart key per user information or per terminal information from the database 340, and manages the use status of the registered smart key.

For example, if the authentication result inputted from the authentication part 320 is authentication success, the key management part 325 can duplicate the registered smart key in correspondence with the terminal information or the user information included in the smart key duplicate request message according to the smart key duplicate request message, map the duplicated smart key with the target terminal information, and register the duplicated smart key in the database 340. Here, the key management part 325 can set the use status of the duplicated smart key corresponding to the target terminal information as a use available state and register the use status in the database 340 at the same time.

If the authentication result inputted from the authentication part 320 is authentication failure, the key management part 325 can change the use status of the smart key registered in the database 340 to a delete state in correspondence with the target terminal information included in the smart key delete request message according to the smart key delete request message from the user terminal 110. Of course, depending on how it is embodied, the smart key registered in the database 340 can be deleted in correspondence with the target terminal information. Moreover, the key management part 325 can generate a smart key delete message according to the smart key delete request message and control the smart key delete message to be sent to the target terminal. Accordingly, the target terminal can delete a smart key stored in a smart card of the target terminal.

Moreover, if the authentication result is authentication success, the key management part 325 can change and register the terminal information of the smart key stored in correspondence with the user terminal 110 to the target terminal information according to a smart key move request message received from the user terminal 110 through the communication part 310.

Accordingly, afterwards, even if an application for controlling the motor vehicle is executed in the user terminal 110, an application execution error message can be outputted because the smart key stored in the smart card is deleted or the use status of the smart key registered in the smart key management apparatus 120 is registered as the delete state.

Although it is assumed in FIG. 3 that the key management part 325 duplicates one smart key and sends/moves the one smart key to the target terminal or deletes the smart, it shall be appreciated that the above description can be equivalently applied to a case in which a plurality of smart keys are duplicated.

The loss registration part 330 sets the use status of a smart key corresponding to lost terminal information to a lost state according to a loss registration request message including the lost terminal information from the user terminal 110.

In another example, the loss registration part 330 can set the use state of a smart key to a lost state according to the loss registration request message including the smart key from the user terminal 110.

Specifically, the loss registration part 330 can receive the loss registration request message including information on the lost terminal (i.e., lost target terminal information) from the user terminal 110 and change the use state of the registered smart key corresponding to the lost terminal only to the lost state so that only the pertinent lost terminal may not use the corresponding smart key.

In another example, the loss registration part 330 can set the statuses of all registered smart keys corresponding to the pertinent lost terminal as a lost state according to the loss of one terminal so that the pertinent smart key may not be used in any terminals sharing the pertinent smart key. This will be further described later in more detail with reference to the corresponding drawing.

The database 340 maps and stores the smart key per user information or per terminal information. Also, the database 340 can further map and store the use status for the smart key. Moreover, the databases 340 can further map and store the time of use for the smart key.

The message transmission part 335 generates an instruction message corresponding to duplicating, moving or deleting the smart key according to a control of the server control part 345 and transmits the instruction message to a registered terminal that is predetermined.

Also, if validity information inputted through the validity checking part 315 is invalid, the message transmission part 335 can generate and transmit an instruction message including the use status to the registered terminal.

The server control part 345 handles the function of controlling the internal elements (i.e., the communication part 310, the validity checking part 315, the authentication part 320, the key management part 325, the loss registration part 330, the database 340 and the message transmission part 335) of the smart key management apparatus 120 in accordance with an embodiment of the present invention.

Figure 4:
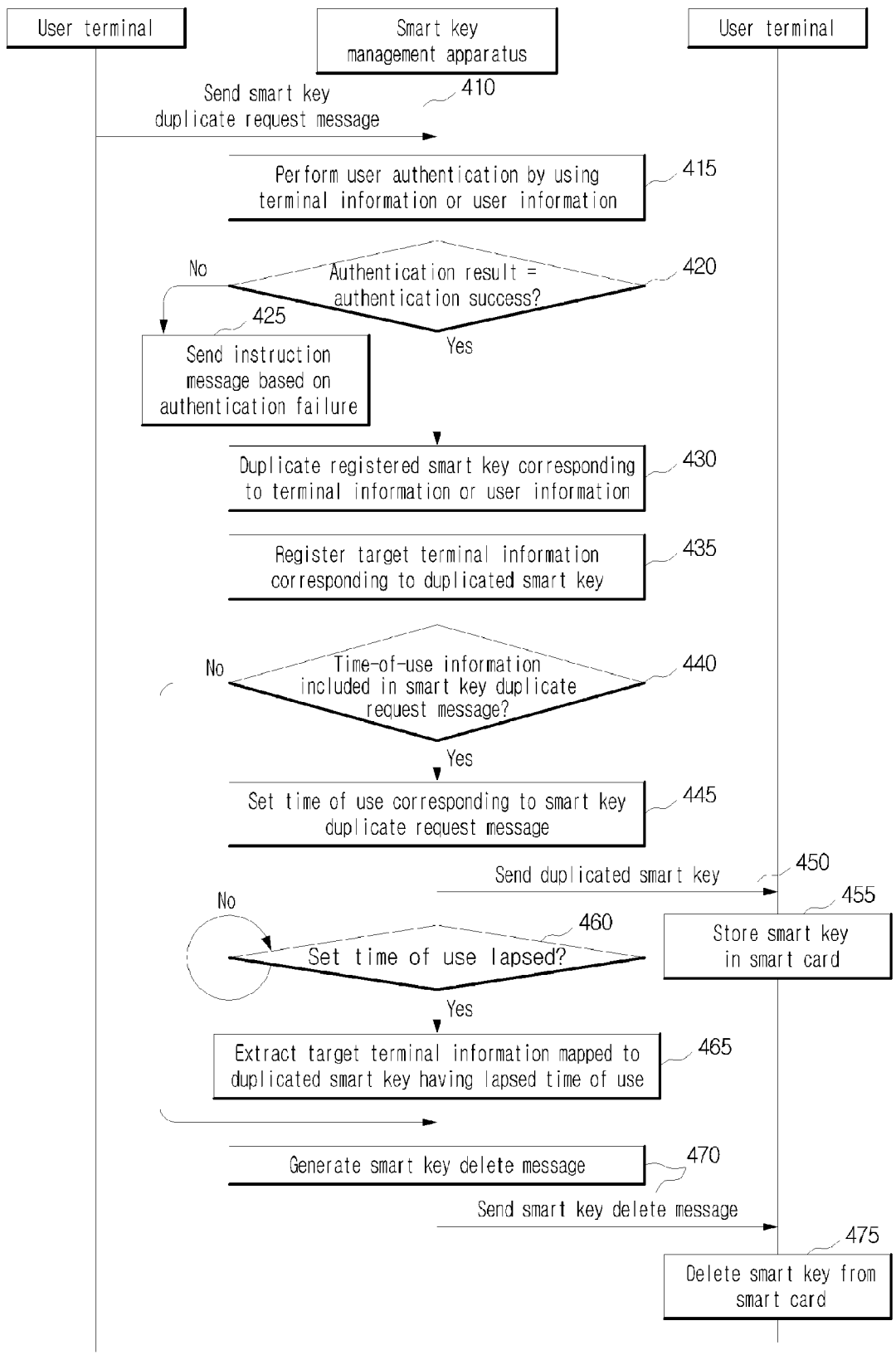
FIG. 4 is a flow diagram illustrating a method of duplicating and sending a smart key to another terminal in accordance with an embodiment of the present invention.

FIG. 4 is a flow diagram illustrating a method of duplicating and sending a smart key to another terminal in accordance with an embodiment of the present invention.

In step 410, the smart key management apparatus 120 receives a smart key duplicate request message from the user terminal 110. Here, the smart key duplicate request message includes terminal information or user information of the user terminal 110 and target terminal information. The target terminal information, which is identification information of a target terminal to which a duplicated smart key will be transmitted, can be a telephone number. Terminal information is identification information for identifying the user terminal 110 and can be, for example, a telephone number or an IMSI (International Mobile Subscriber Identify).

In step 415, the smart key management apparatus 120 performs user authentication by comparing the terminal information or user information included in the pertinent smart key duplicate request message with terminal information or user information pre-stored in the database 340.

Then, in step 420, the smart key management apparatus 120 determines whether authentication result is authentication success.

If the authentication result is authentication failure, in step 425, the smart key management apparatus 120 generates and sends an instruction message based on the authentication failure to the user terminal 110.

However, if the authentication result is authentication success, in step 430, the smart key management apparatus 120 duplicates the registered smart key corresponding to the pertinent terminal information or user information.

Then, in step 435, the smart key management apparatus 120 registers the target terminal information corresponding to the duplicated smart key and sets the use state as a sue available state.

In step 440, the smart key management apparatus 120 checks whether time-of-use information is included in the smart key duplicate request message.

In case the time-of-use information is included in the smart key duplicate request message, in step 445, the smart key management apparatus 120 registers and sets the time of use corresponding to the duplicated smart key in the database 340.

However, in case the time-of-use information is not included in the smart key duplicate request message, step 470 is performed.

In step 450, the smart key management apparatus 120 uses the target terminal information to send the duplicated smart key to the target terminal. Then, the smart key management apparatus 120 can send an instruction message based on smart key duplication to a registered terminal, which is predetermined. Here, the smart key management apparatus 120 can generate the instruction message that includes the number of smart key duplications and the target terminal information to which the duplicated smart key is provided and transmit the generated instruction message to the registered terminal.

Accordingly, in step 455, the target terminal receives the duplicated smart key from the smart key management apparatus 120 and stores the duplicated smart key in a smart card.

In step 460, the smart key management apparatus 120 determines whether the time of use set in the duplicated smart key is lapsed.

In case the set time of use is lapsed, in step 465, the smart key management apparatus 120 extracts target terminal information mapped to the duplicated smart key of which the time of use is lapsed.

In step 470, the smart key management apparatus 120 generates a smart key delete message using the extracted target terminal information and transmits the smart key delete message to the target terminal. Here, the smart key delete message includes a control command instructing the deletion of the smart key. Accordingly, the target terminal can delete the smart key according to the pertinent control command through an executed application.

In step 475, the target terminal deletes the smart key stored in the smart card of the target terminal according to the smart key delete message.

It has been assumed and described in FIG. 4 that each duplicated smart key is set with the time of use and the smart key with the time of use lapsed is deleted from the pertinent target terminal.

However, if the time of use is not set in each smart key, the smart key management apparatus 120 can receive the smart key delete request message from the user terminal 110 and can allow the smart key to be deleted by sending the smart key delete message to the target terminal.

Moreover, the smart key management apparatus 120 can set the use status according to the time of use of the smart key and manage the smart key to be used or not to be used in the user terminal 110 during the pertinent time of use.

It has been assumed and described in FIG. 4 that there is only one smart key registered in correspondence with the user terminal 110 and this one registered smart key is duplicated to another terminal. However, in case there are plural smart keys registered in correspondence with the user terminal 110, the user terminal 110 can send the smart key duplicate request message including at least one of the plural smart keys to be duplicated to the smart key management apparatus 120 and request the smart key management apparatus 120 to duplicate the at least one of the plural smart keys.

Figure 5:
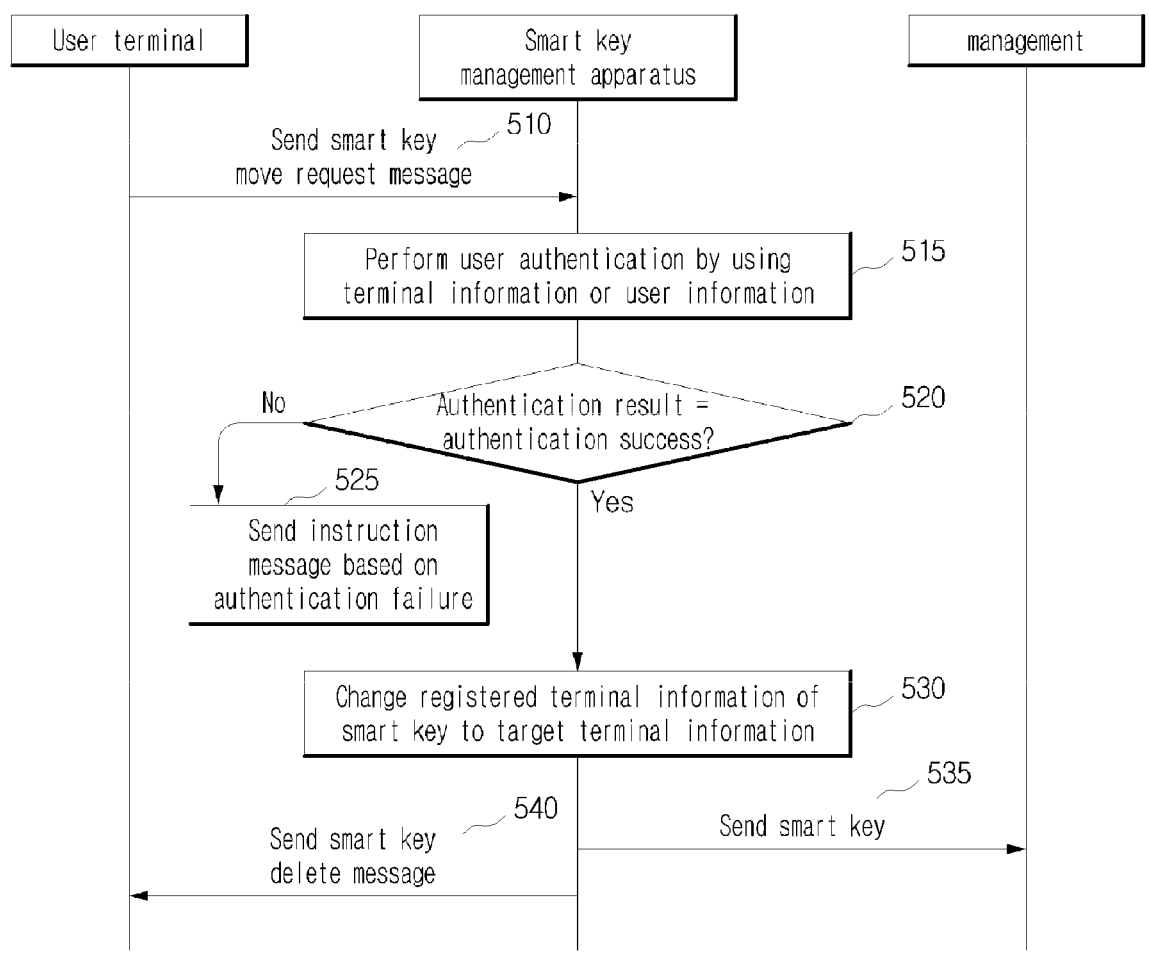
FIG. 5 is a flow diagram illustrating a method of managing a smart key resulting from moving the smart key.

FIG. 5 is a flow diagram illustrating a method of managing a smart key resulting from moving the smart key.

In step 510, the user terminal 110 generates a smart key move request message that includes the terminal information and user information on the user terminal 110 and the target terminal information and transmits the smart key move request message to the smart key management apparatus 120. Of course, depending on how it is embodied, the smart key move request message can include terminal information on a terminal in which the smart key is stored and terminal information on a terminal to which the smart key is to be moved.

It is assumed and described in FIG. 5 that one smart key corresponding to the user terminal 110 or the user information is registered in the database. However, in case the smart key to move is not a smart key registered corresponding to the user terminal 110 or the user information, or in case plural smart keys are registered corresponding to the user terminal 110 or the user information, it is possible that the user terminal 110 transmits the smart key move request message including the smart key that is to be moved.

Steps 515 to 525 are identical to steps 415 to 425 in FIG. 4, respectively, and thus the description thereof will not be repeated herein.

In step 530, the smart key management apparatus 120 changes the registered terminal information of the smart key to the target terminal information in accordance with the terminal information or the user information included in the smart key move request message.

In case the smart key to be moved is included in the smart key move request message, the smart key management apparatus 120 can change the registered terminal information to the target terminal information in accordance with the smart key to be moved.

In step 535, the smart key management apparatus 120 transmits the smart key to the target terminal by using the target terminal information. Accordingly, the target terminal stores the smart key received from the smart key management apparatus 120 in the smart card installed in the pertinent target terminal.

In step 540, generates and transmits a smart key delete message to the user terminal 110 using the terminal information. Accordingly, the user terminal can delete the smart key stored in the smart card of the pertinent target terminal, once the smart key delete message is received from the smart key management apparatus 120.

Although it is described herein that step 535 and step 540 are successively performed, it shall be appreciated that step 535 and step 540 are performed in parallel or step 540 is performed prior to step 535.

Figure 6:
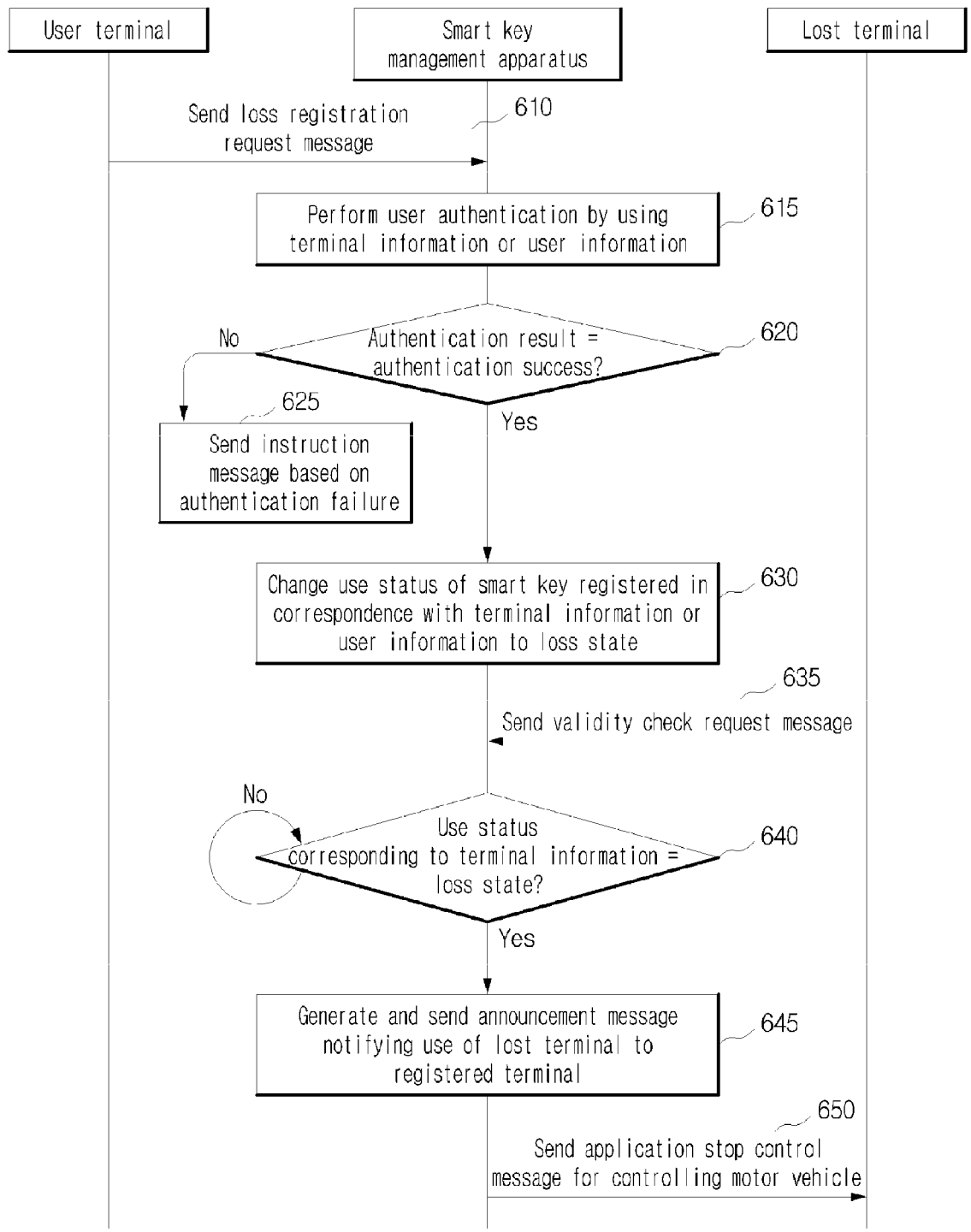
FIG. 6 is a flow diagram illustrating a method of managing a smart key resulting from losing the smart key.

FIG. 6 is a flow diagram illustrating a method of managing a smart key resulting from losing the smart key.

In step 610, the user terminal 110 generates and transmits a loss registration request message including the terminal information or user information of the pertinent user terminal 110 to the smart key management apparatus 120.

Steps 615 to 625 are identical to steps 415 to 425 in FIG. 4, respectively, and thus the description thereof will not be repeated herein.

If the authentication result is authentication success, in step 630, the smart key management apparatus 120 changes the use status of the smart key registered in correspondence with the terminal information or user information to a loss state.

Afterwards, once the lost terminal executes the application installed for controlling the motor vehicle, the lost terminal generates and transmits a validity check request message in accordance with the execution of the application to the smart key management apparatus 120.

In step 635, the smart key management apparatus 120 receives the validity check request message from the lost terminal. Here, the validity check request message includes terminal information of the lost terminal.

In step 640, the smart key management apparatus 120 determines whether or not the use status of the registered smart key corresponding to the terminal information included in the validity check request message is in a loss state.

If the use status of the registered smart key is in a loss state, in step 645, the smart key management apparatus 120 generates and transmits an announcement message notifying the use of the lost terminal to the pre-registered terminal.

In step 650, the smart key management apparatus 120 generates and transmits an application stop control message including a control command for forcefully stopping the application to the lost terminal. Accordingly, once the application stop control message is received, the lost terminal can forcefully stop the executed application.

Figure 7:
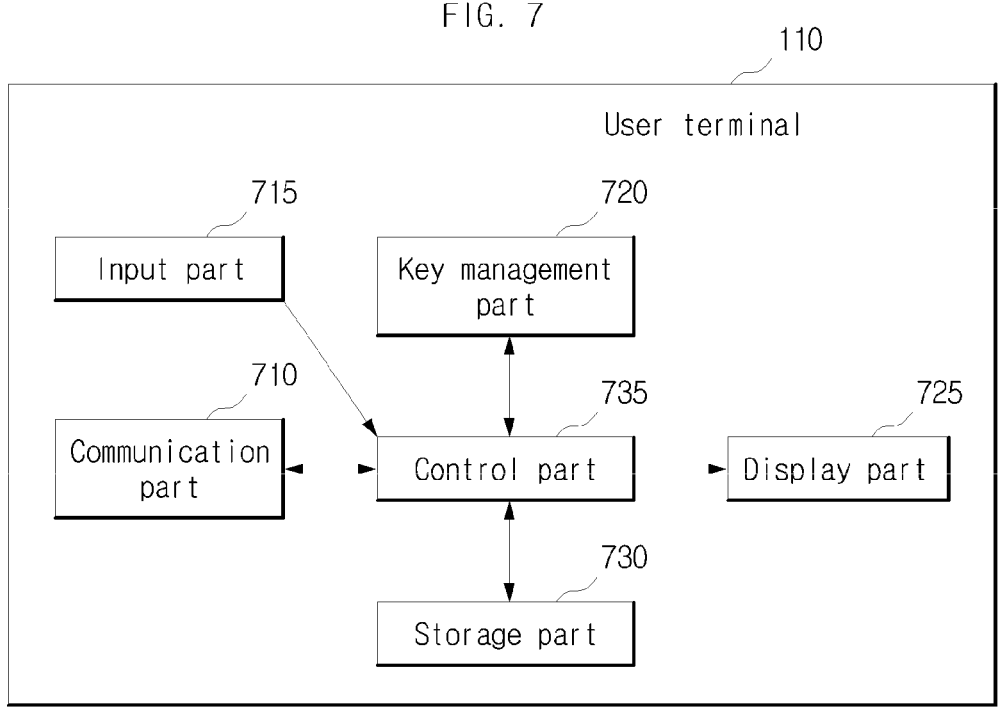
FIG. 7 is a block diagram briefly illustrating an internal configuration of a user terminal that manages a smart key.

FIG. 7 is a block diagram briefly illustrating an internal configuration of a user terminal that manages a smart key. Here, the user terminal 110 is an apparatus in which a smart card having the smart key stored therein is installed.

Referring to FIG. 7, the user terminal 110 is configured by including a communication part 710, an input part 715, a key management part 720, a display part 725, a storage part 730 and a control part 735.

The communication part 710 handles the function of communicating data with other apparatuses (e.g., the smart key management apparatus 120 or other terminals) through a communication network.

The input part 715 is a means for being inputted with a control command for controlling the operation of the pertinent user terminal 110, a control command for executing an application, etc. For example, the input part 715 can be realized with a plurality of key buttons (e.g., alphanumeric keys, * and # keys, etc.) and one or more function keys (e.g., a menu key, a call key, an enter key, a run application key, etc.) or with, for example, a touch screen.

For instance, the input part 715 can be inputted with a smart key duplicate command including target terminal information from the user and output the smart key duplicate command to the key management part 720. Here, the input part 715 can be additionally inputted with time-of-use information for the smart key corresponding to the pertinent target terminal information.

The key management part 720 is a means for managing the smart key stored in the smart card installed in the user terminal 110. For example, the key management part 720 can extract and copy the smart key stored in the smart card, according to the smart key duplicate command inputted through the input part 715. Moreover, if the time-of-use information is set for the duplicated smart key, the key management part 720 can generate a delete message that includes a control command instructing the deletion the smart key after the time of use is lapsed.

The display part 725 is a means for displaying commands inputted through the input part 715 according to the control of the control part 735. For example, the display part 725 can be an LCD (liquid crystal display).

The storage part 730 stores a variety of applications required for implementing the user terminal 110.

The control part 735 handles the function of controlling internal configuration elements (e.g., the communication part 710, the input part 715, the key management part 720, the display part 725, the storage part 730, etc.) of the user terminal 110.

Figure 8:
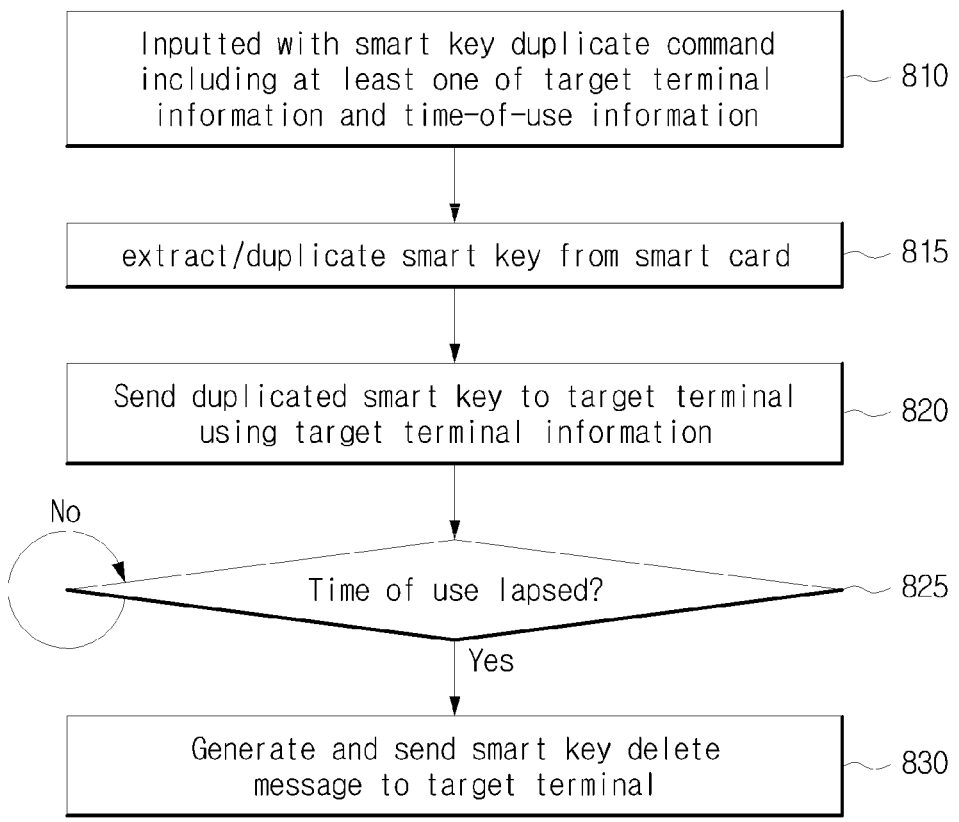
FIG. 8 is a flow diagram illustrating a method of managing a smart key in a user terminal.

FIG. 8 is a flow diagram illustrating a method of managing a smart key in a user terminal. Although the steps described below are carried out by their respective internal configuration elements of the use terminal 110, these internal configuration elements will be collectively referred to as the user terminal 110 for the convenience of description and understanding.

In step 810, the user terminal 110 is inputted with a smart key duplicate command including at least one of target terminal information and time-of-use information from a user. Here, the target terminal information is identification information for a terminal to which a duplicated smart key will be provided, and can, for example, a telephone number.

In step 815, the user terminal 110 extracts and duplicates a smart key from a smart card according to the smart key duplicate command. Then, the user terminal 110 stores a target terminal that will use the duplicated smart key by use of the target terminal information.

Then in step 820, the user terminal 110 transmits the duplicated smart key to the target terminal by use of the target terminal information. Then, the user terminal 110 sets time-of-use information for the target terminal information.

In step 825, the user terminal 110 determines whether or not the set time of use is lapsed according to the target terminal information.

If the time of use is lapsed, in step 830, the user terminal 110 generates and transmits a delete message including a control command instructing the smart key to be deleted to the target terminal.

However, if the time of use is not lapse, step 825 stands by until the time of use is lapsed.

Although it is assumed and described in FIG. 8 that the user terminal 110 generates and transmits the delete message instructing the smart key to be deleted to the target terminal if the time of use set for the target terminal is lapsed, it is also possible that, depending on how it is embodied, the delete message can be transmitted to the target terminal if a delete command is inputted by the user.

Figure 9:
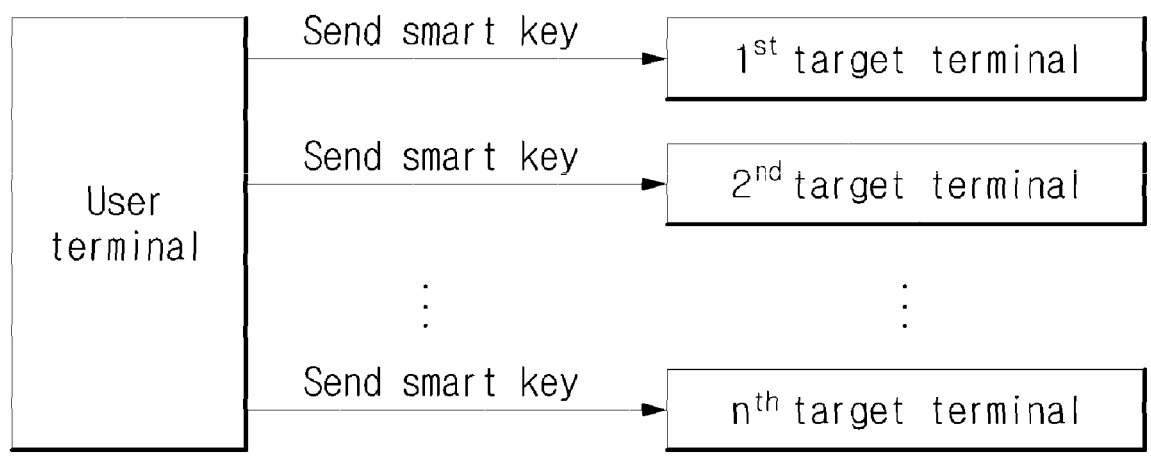
FIG. 9 illustrates how a smart key is provided to a plurality of user terminals and the use of the smart key is scheduled.

FIG. 9 illustrates how a smart key is provided to a plurality of user terminals and the use of the smart key is scheduled.

It will be assumed here that the smart key is duplicated according to the smart key duplicate request message by the method described above and is provided to a first target terminal, a second target terminal and an $n^{th}$ target terminal, n being a natural number.

As described above, the user terminal 110 can transmit the smart key duplicate request message by including the time-of-use information for each target terminal. Here, the time-of-use information can be information indicating the time of single use or the time of periodical use. In case the time-of-use information indicates the time of periodical use, the smart key management apparatus 120 can set the use state of the smart key of the target terminal to a use available state according to the pertinent time-of-use information.

For example, in case the smart key is duplicated and provided to a plurality of target terminals as shown in FIG. 9, the user terminal 110 can be set in such a way that the first target terminal can use the motor vehicle on every Monday, the second target terminal on every Tuesday, and the $n^{th}$ target terminal on every Friday. In this case, the smart key management apparatus 120 can set the use status of the first target terminal as a use available state on every Monday and a use unavailable state on all the other days. Likewise, the smart key management apparatus 120 can set the use status of the second target terminal as a use available state on every Tuesday and a use unavailable state on all the other days.

In this method, the smart key management apparatus 120 can schedule the use of the smart key of each target terminal, by setting and updating the use status of each target terminal as a use available or use unavailable state according to the time-of-use information of periodical use.

In the smart key management system in accordance with an embodiment of the present invention, the method of managing a smart key can be written in a storage medium by being embodied in a program command form that can be performed through various electronic data processing means. The storage medium can include a program command, a data file, a data structure, etc. individually or in combination thereof.

The program command written in the storage medium can be specially designed for the present invention or can be already available in the field of software. Examples of the storage medium can include magnetic media such as a hard disk, a floppy disk and magnetic tape, optical media such as CD-ROM and DVD, magneto-optical media such as a floptical disk, and hardware devices such as ROM, RAM and flash memory that are specially configured to store and execute a program command. Alternatively, a transmission medium, such as an optical line, metallic line, waveguide, etc., which include carrier wave that transmits signals designating the program command, data structure, etc. can be used. Examples of the program command can include not only a machine-language code written by a compiler but also a device electronically processing data using an interpreter, for example, a high-level language code that can be executed in a computer.

The above hardware devices can be configured to operate as one or more software modules in order to carry out the operations of the present invention.

While certain embodiments of the present invention have been described, it shall be appreciated that there can be a variety of permutations and modifications by those who are skilled in the art to which the present invention pertains without departing from the technical ideas and scopes of the present invention which shall be defined by the claims appended below.

What is claimed is:

1. An apparatus for smart key management, comprising:
   a communication part configured to receive a smart key duplicate request message from a user terminal, the smart key duplicate request message comprising target terminal information and at least one of terminal information and user information of the user terminal;
   a validity checking part configured to periodically receive a validity check request message from the user terminal via the communication part, and to check a validity of a registered smart key corresponding to the terminal information or the user information based on information included in the validity check request message;
   an authentication part configured to perform user authentication and generate an authentication result by using the terminal information or the user information; and
   a key management part configured to duplicate the registered smart key corresponding to the terminal information or the user information if the authentication result is authentication success and configured to control the communication part to transmit the duplicated smart key to a target terminal using the target terminal information;
   a loss registration part configured to set a use status of a smart key registered according to the terminal information or the user information as a lost state according to a loss registration request message including at least one of the terminal information and the user information; and
   a message transmission part configured to generate an announcement message notifying use of a lost terminal if a validity check request message is received from the user terminal or the target terminal of which the use status is in the loss state and to transmit the announcement message to a pre-registered terminal.

2. The apparatus for smart key management of claim 1, wherein the target terminal is plurality.

3. The apparatus for smart key management of claim 1, wherein the key management part is configured to register a use status of the duplicated smart key as a use available state by using the target terminal information.

4. The apparatus for smart key management of claim 1, wherein the smart key duplicate request message further comprises time-of-use information, and
   wherein the key management part is configured to set a time of use for the target terminal according to the time-of-use information.

5. The apparatus for smart key management of claim 4, wherein the key management part is configured to control the communication part to generate and transmit a delete message to the target terminal if the time of use is lapsed.

6. The apparatus for smart key management of claim 1, wherein the key management part is configured to generate a delete message of the duplicated smart key by using the target terminal information according to a delete request message of the user terminal and to control the communication part to transmit the delete message to the target terminal.

7. A method for smart key management by a smart key management apparatus connected with one or more user terminals through a communication network, the method comprising:
   (a) receiving a smart key duplicate request message from the user terminal, the smart key duplicate request message comprising target terminal information and at least one of terminal information and user information of the user terminal;
   (b) periodically receiving a validity check request message from the user terminal, and checking a validity of a registered smart key corresponding to the terminal information or the user information based on information included in the validity check request message;
   (c) performing user authentication and generating an authentication result by using the terminal information or the user information;
   (d) duplicating a registered smart key corresponding to the terminal information or the user information if the authentication result is authentication success and transmitting the duplicated smart key to a target terminal using the target terminal information;

receiving a loss registration request message including the terminal information or the user information from the user terminal;

setting a use status of a registered smart key corresponding to the terminal information or the user information as a lost state;

receiving a validity check request message including terminal information from the user terminal or the target terminal; and generating an announcement message notifying use of a lost terminal if the use status of the terminal information is in the lost state and transmitting the announcement message to a pre-registered terminal.

8. The method of claim 7, further comprising, after the step (c), registering a use status of the duplicated smart key as a use available state by using the target terminal information.

9. The method of claim 7, wherein in the step (a), the smart key duplicate request message further comprises time-of-use information; and further comprising, after the step (c), setting a time of use for the target terminal according to the time-of-use information.

10. The method of claim 7, further comprising generating and transmitting a delete message to the target terminal if the time of use is lapsed.

11. The method of claim 7, further comprising, after the step (d):

receiving a smart key delete request message including target terminal information of the user terminal; and generating a smart key delete message including a control command instructing deletion of the duplicated smart key by using the target terminal information according to the smart key delete request message and transmitting the smart key delete request message to the target terminal.

12. The apparatus for smart key management of claim 1, wherein the target terminal information comprises identification information relating to the target terminal.

13. The apparatus for smart key management of claim 12, wherein the target terminal information comprises a telephone number relating to the target terminal.

* * * * *